July 12, 1949.  J. W. DAWSON  2,475,596
METHOD OF EXAMINING WELDED SURFACES
Filed Aug. 13, 1945
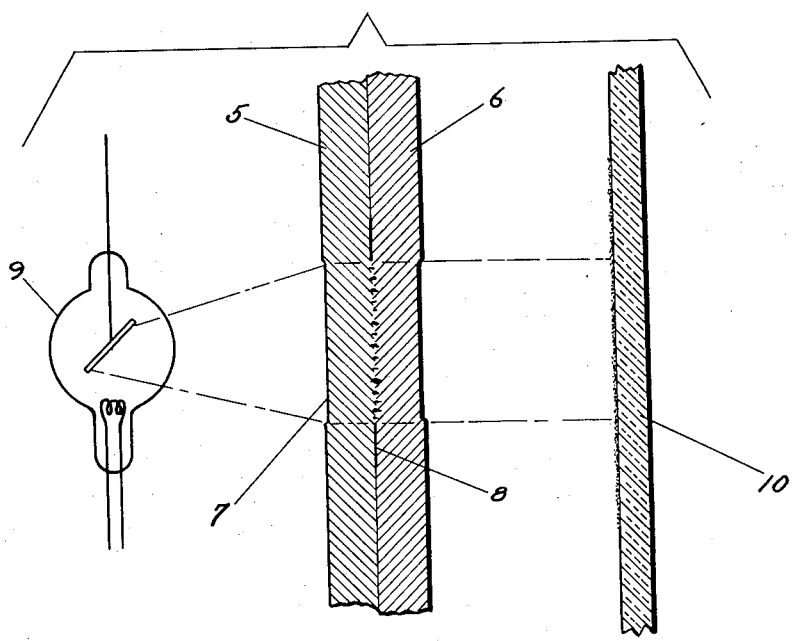
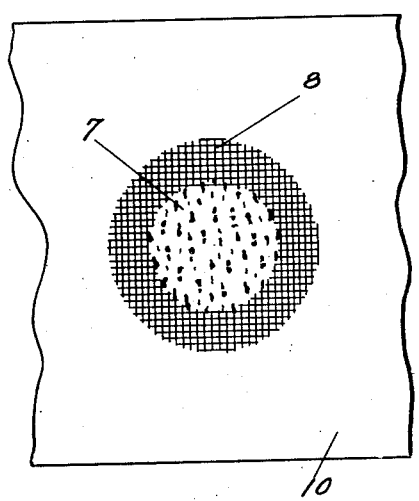 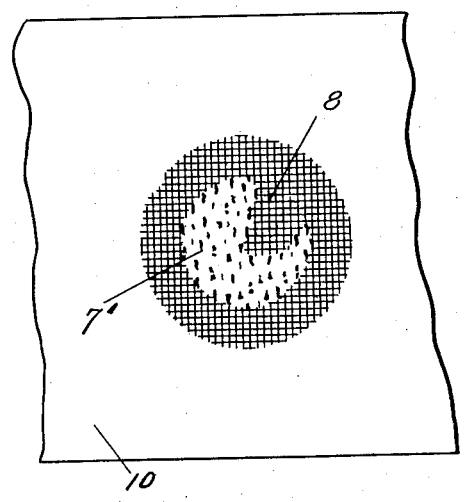
INVENTOR.
JOHN W. DAWSON,
BY Elmer J. Gorn
ATTY.

Patented July 12, 1949

2,475,596

UNITED STATES PATENT OFFICE 2,475,596

METHOD OF EXAMINING WELDED SURFACES

John W. Dawson, West Newton, Mass., assignor to Raytheon Manufacturing Company, Newton, Mass., a corporation of Delaware Application August 13, 1945, Serial No. 610,584

4 Claims. (Cl. 250—65)

This invention relates to the art of examining welded materials to determine the efficacy of a weld.

Present X-ray techniques are effective in disclosing fissures in the weld region provided these extend in the direction of view. However, it has heretofore been almost impossible to detect whether or not the weld has even partially fused together the two sheets. The X-ray photograph of a defective weld may appear about the same as one which is fused over the entire weld area. Thus, on tearing apart a number of welds which had previously been examined by the usual X-ray technique, some have been found which showed torn matter over about one-half of the area of the electrode impression, while others showed that the metal had been broken over the entire area, yet the X-ray photographs disclosed no material difference in welds.

The present invention contemplates a process which will provide a much more reliable X-ray determination of the structure of the weld. To this end the invention contemplates the employment of a thin film of metal having a different transparency to the X-rays than the material being welded. During the welding operation the thin film is broken up over the entire area at which fusion takes place while it is not broken in areas where no fusion occurs. The X-ray photograph of the weld then shows marked differences between areas of fusion and areas of non-fusion. Thus a defective weld which is not fused over the entire area of the electrode impression may be readily detected in the usual photographic or fluoroscopic examination.

The above and other objects and features of the invention will be made fully apparent to those skilled in the art from a consideration of the following detailed description taken in conjunction with the accompanying drawing in which:

Fig. 1 illustrates a pair of welded sheets which have been prepared and are under examination in accordance with the present process;

Fig. 2 shows the appearance of a weld which has been effectively fused over the entire area of the electrode impression; and Fig. 3 shows the appearance of a weld which shows unfused areas.

Referring to the drawing, reference numerals 5 and 6 indicate a pair of metal sheets which have been welded in the region 7. Prior to the welding operation, one of the sheets 5 or 6 is coated over an area at least coextensive with the welding area 7 with a thin sheet of metallic material 8 which is less transparent to X-rays than the material of the sheets 5 and 6. Where the sheets 5 and 6 are aluminum, the coating 8 may, for example, be copper which at a properly selected X-ray wave length is ten times more opaque than aluminum. The material 8, however, may be any other suitable metal having a different transparency to the X-rays than the material to be welded. Instead of being plated upon one or both the sheets it may be a thin foil of the more opaque material inserted therebetween. During the welding operation the thin plating or foil 8 will be disturbed in the region of actual fusion. The foil is broken up into small flakes or partially alloyed with the aluminum in such a manner that throughout the area of actual fusion the copper will be present only in small particles and interfere very little with the passage of X-rays therethrough. When the weld is exposed to X-rays from a suitable source, such as the X-ray tube 9, the rays will pass readily through the area 7 of the weld and may be detected on the viewing screen 10 of a fluoroscope or may be recorded on a photographic film. Where the fusion has been complete over the entire area of the weld, the positive X-ray image will appear as in Fig. 2. The weld area 7 will present a somewhat stippled appearance due to the presence of small broken up particles of the more opaque material. Any portion of the film or plating 8 surrounding the weld area will appear much darker than the area of fusion. If the weld has only partially fused the material of the two sheets over the area of the electrode impression, then the positive image of the X-rays will have the appearance shown in Fig. 3. That portion 7' of the weld area which is effectively fused will have the same appearance as the weld area 7 of Fig. 2, and the portion which is unfused will appear as a dark area differing little or not at all from the area 8 which was beyond the area between the welding electrodes.

It will be understood that the plating or foil 8 need not extend beyond the area of the electrode impression. In such a case the area of fusion will not be outlined by a black or dark area surrounding the same. However, the area covered by the plating or the film 8 should at least be coextensive with the area of fusion, in which case any unfused areas within the area of the electrode impression will appear as dark or black spaces in the positive of the electron image.

For convenience, the X-ray image has been described as it would appear as a positive image on a photographic print or upon the screen of a fluoroscope. It will be understood that the image will be reversed on a photographic negative which, for purposes of the present invention, is as suitable for examination as a positive print.

While there have been herein described certain preferred embodiments of the invention, other embodiments within the scope of the appended claims will be obvious to those skilled in the art from a consideration of the forms shown and the teachings hereof. Accordingly, a broad interpretation of the appended claims commensurate with the scope of the invention within the art is desired.

What is claimed is:

1. The method of examining welded surfaces which consists of introducing a thin film of material between the surfaces prior to welding, which film has a substantially different transparency to X-rays than the material forming said surfaces, welding said surfaces together, whereby the areas at which fusion takes place have a substantially different transparency to X-rays than the areas which fail to fuse, and exposing the weld area to X-rays to produce an X-ray image of said area.

2. The method of examining welded surfaces which consists of introducing a thin film of material between the surfaces prior to welding, which film is substantially less transparent to X-rays than the material forming said surfaces, welding said surfaces together, whereby the areas at which fusion takes place become substantially more transparent to X-rays than the areas which fail to fuse, and exposing the weld area to X-rays to produce an X-ray image of said area.

3. The method of examining welded surfaces which consists in plating at least one of the surfaces in the area to be welded with a thin coating of a material which is substantially less transparent to X-rays than the material forming said surfaces, welding said surfaces together, whereby the areas at which fusion takes place become substantially more transparent to X-rays than the areas which fail to fuse, and exposing the weld area to X-rays to produce an X-ray image of said area.

4. The method of examining welded surfaces which consist of introducing a thin foil of material between the surfaces prior to welding, which foil has a substantially different transparency to X-rays than the material forming said surfaces, welding said surfaces together, whereby the areas at which fusion takes place have a substantially different transparency to X-rays than the areas which fail to fuse, and exposing the weld area to X-rays to produce an X-ray image of said area.

JOHN W. DAWSON.

REFERENCES CITED

The following references are of record in the file of this patent:

UNITED STATES PATENTS

| Number | Name | Date |
|---|---|---|
| 1,622,149 | St. John | Mar. 22, 1927 |
| 2,151,758 | Gier | Mar. 28, 1939 |
| 2,330,943 | Anderson | Oct. 5, 1943 |

FOREIGN PATENTS

| Number | Country | Date |
|---|---|---|
| 285,490 | Germany | July 9, 1915 |
| 404,923 | Germany | Nov. 1, 1924 |

OTHER REFERENCES

Spraragen et al.: "Resistance welding aluminum and its alloys," Journal of the American Welding Society, July 1940, page 248-S (Supplement). Copy in Scientific Library, 219–10 (48).